United States Patent [19]
Thorpe

[11] Patent Number: 5,917,996
[45] Date of Patent: Jun. 29, 1999

[54] SYSTEM FOR PRINTING TAMPER-RESISTANT ELECTRONIC FORM CHARACTERS

[75] Inventor: John P. Thorpe, Baldock, United Kingdom

[73] Assignee: Xerox Corporation, Stamford, Conn.

[21] Appl. No.: 08/950,625

[22] Filed: Oct. 15, 1997

[30] Foreign Application Priority Data

Oct. 19, 1996 [GB] United Kingdom ................. 96218342

[51] Int. Cl.$^6$ .................................................. G06F 15/00
[52] U.S. Cl. .............................. 395/113; 283/58; 399/366
[58] Field of Search ..................................... 395/101, 106, 395/109, 110, 111, 113, 114, 115, 117; 358/405, 406, 434, 437, 462, 464, 468; 283/57, 58, 59, 86, 94, 95, 98, 901, 902; 380/51, 54, 55; 382/51, 54, 55; 347/171, 172, 173, 174

[56] References Cited

U.S. PATENT DOCUMENTS

| | | | |
|---|---|---|---|
| 5,178,418 | 1/1993 | Merry et al. | 283/73 |
| 5,291,243 | 3/1994 | Heckman et al. | 355/201 |
| 5,395,138 | 3/1995 | Chang | 283/95 |
| 5,602,973 | 2/1997 | Nishiwaki | 395/113 |
| 5,605,873 | 2/1997 | Chang | 503/201 |
| 5,636,874 | 6/1997 | Singer | 283/94 |
| 5,708,717 | 1/1998 | Alasia | 380/51 |
| 5,720,012 | 2/1998 | McVeigh et al. | 395/113 |
| 5,857,709 | 1/1999 | Chock | 283/86 |

FOREIGN PATENT DOCUMENTS

| | | |
|---|---|---|
| 569171A1 | 11/1993 | European Pat. Off. . |
| 2037661 | 7/1980 | United Kingdom . |
| 2228445 | 8/1990 | United Kingdom . |

*Primary Examiner*—Scott Rogers
*Assistant Examiner*—Gabriel I. Garcia
*Attorney, Agent, or Firm*—Gary B. Cohen

[57] ABSTRACT

A system for single-pass printing of a tamper-resistant, electronic form character on a print media sheet is provided. The system includes a printing subsystem and a character generation subsystem communicating with the printing subsystem. The character generation subsystem includes (1) a database for storing a plurality of tamper-resistant, composite electronic form characters, each of the plurality of tamper-resistant, composite electronic form characters including an electronic form character overlaying a security background, and (2) a character manager for retrieving a selected one of the plurality of tamper-resistant, composite electronic form characters from the database in response to an instruction provided by the printing subsystem to the character manager, the selected one of the plurality of tamper-resistant, composite electronic form characters being transmitted to the printing subsystem for single-pass printing thereof on the print media sheet.

12 Claims, 2 Drawing Sheets

SYSTEM FOR PRINTING TAMPER-RESISTANT ELECTRONIC FORM CHARACTERS

Priority is claimed to Great Britain, Application No. 96218342 filed Oct. 19, 1996.

BACKGROUND

The present invention relates to security document printing, and, more particularly, to a system in which tamper-resistant, composite electronic form characters are stored in a database and retrieved by a character manager for single-pass printing on print media with a printing system.

There is continuing interest in developing systems to hinder and/or help detect fraudulent alteration or duplication of sensitive documents. Sensitive document types might for example, include negotiable instruments, especially checks and bank drafts, stock or bond certificates, driving licenses, identification cards or papers, passports, betting slips, prize or game awards, tickets, or documents that simply require validating signatures to be affixed thereto, such as contractual agreements.

One common type of attempted fraud simply involves duplication of the sensitive document, for example using a high-quality color xerographic copying process. Another common type of attempted fraud involves selective removal of the ink/toner forming the text on the document and its subsequent replacement by alternative text.

Negotiable instruments and other such security documents are now often over-printed on specially prepared "safety paper" which has a background pattern which is not readily reproducible by a copying process. The information/text specific to the particular document is then printed onto the specially pre-prepared safety paper in a separate printing operation. The background pattern of the safety paper may be visible to the human eye. Such a pattern might comprise a complex, often multicolored, geometrical pattern, or be a watermark which is most visible when the document is held up to the light Alternatively, the background pattern may be a latent mark that becomes visible or legible only upon attempted reproduction on machines such as xerographic photocopiers, or by exposure to certain wavelengths of light (e.g. UV).

A disadvantage associated with the reliance on safety paper lies in the cost of its preparation. To stay one step ahead of potential forgers, it is necessary to constantly introduce new variants of the background pattern which adds still further to cost. Secure storage of the safety paper is also an expensive necessity, since any theft of the paper will give the forger a is platform from which to produce fraudulent documents on the authentic (stolen) safety paper.

A further disadvantage with safety paper is that if local shortages of the necessary safety paper arise at the document printing site this can results in delays to the printing of the desired documents, which can be a serious business or legal problem. For this reason, it would be advantageous if security documents could be generated on demand without necessarily requiring special paper supplies of pre-printed safety background paper.

One known approach to the protection of (document specific) text on security documents involves printing of the text followed by overprinting of this text with security information such as background patterning, or embellishment of some or all of the text. In alternative approaches specially positioned perforations are applied to the document, or the document is coated with chemicals (applied pre or post printing), or holographic transparent tape is fixed over the (document specific) text. A disadvantage with these types of approach is that they involve multiple printing or processing steps which adds to the expense, especially if colored printing techniques are employed. There are therefore advantages in the development of on demand security printing systems in which both the (document specific) text of the document and the security features are applied in a single step (or single pass').

U.S. Pat. No. 5,291,243 describes such a system for the single-pass printing of an image comprising alphanumerics and a plural color safety background pattern. The image is generated by integrating electronic information from a standard font database with that of an electronically generated safety background pattern, and transmission of this integrated electronic description of the image to a printer. While this system provides the advantages associated with single-pass printing, it has the disadvantage that the image generation system is relatively complex.

It would be desirable to provide an alternative, and less complex, single-pass printing system which employs a database of characters with a (preset) security background. Thus, the need for a separate step of integrating character (font) information with background information is avoided.

It would further be desirable that the single-pass secure printing system could be advantageously employed in combination with other document security features. For example, the combined use of the printing system with safety paper has been found to lead to a particularly secure overall system. It has been found that it can be beneficial, from a security standpoint, if the printing system uses the same toner/ink to print both character and background information. If the same toner/ink is employed, the adhesion characteristics of both the printed characters and background to the substrate will be identical. Selective removal of character(s) or background is thus made more difficult than would be so were different toners/inks of correspondingly different adhesion characteristics to be used for the character and background portions.

Alternatively, different colors of ink can be used for the character and background information respectively, allowing for better visual recognition of any attempted tampering.

SUMMARY OF THE INVENTION

In one aspect of the present invention there is provided a system for single-pass printing of a tamper-resistant, electronic form character on a print media sheet. The system includes a printing subsystem and a character generation subsystem communicating with the printing subsystem. The character generation subsystem includes (1) a database for storing a plurality of tamper-resistant, composite electronic form characters, each of the plurality of tamper-resistant, composite electronic form characters including an electronic form character overlaying a security background, and (2) a character manager for retrieving a selected one of the plurality of tamper-resistant, composite electronic form characters from said database in response to an instruction provided by said printing subsystem to said character manager, the selected one of the plurality of tamper-resistant, composite electronic form characters being transmitted to said printing subsystem for single-pass printing thereof on said print media sheet.

DESCRIPTION OF THE INVENTION

Figure 1:
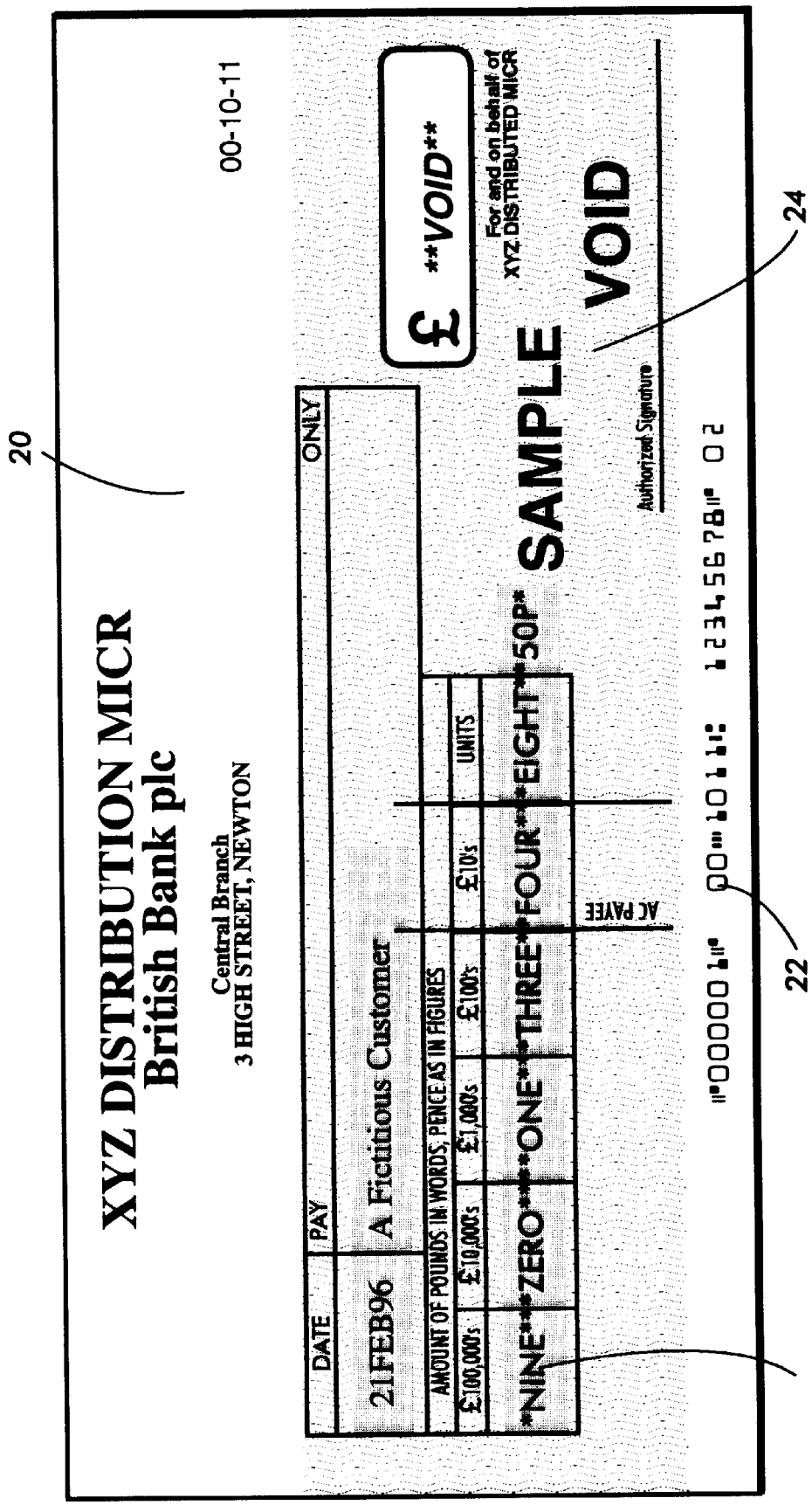
FIG. 1 is an elevational view of a check prepared in accordance with the printing system of the invention.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

The following description is directed, in part, toward systems for single-pass printing of a character or a character stream having a security background on a document.

The single-pass printing is carried out using an electronic printer, which is responsive to an electronically communicated set of instructions to print. Generally, the instructions will be in the form of a known electronic printing standard. Essentially any electronic printer is suitable. The printer may be in the same location as the other elements of the printing system, or alternatively it may in another location and be linked to the rest of the system by for example, a local network or by the internet.

The receiving medium for the printed character or character stream can be any suitable printable substrate, particularly paper or acetate substrates.

The term 'single-pass printing' herein is used in its conventional sense, and means that the printing operation involves only a single passage of the printable substrate through the printer or alternatively, a single passage of the printer across the substrate.

The term 'character' herein means any printable symbol or mark, which is preferably distinctive, including particularly alphanumerics. The term 'character stream' herein means a series of characters, in any order. In preferred aspects, the character stream can be a series of letters assembled to form a word or sentence, a series of numbers, or a series including any mixture of letters, numbers and symbols, such as the expression 'pay $1000 to'.

The characters have a printable 'security background', which term herein is used in the sense familiar to one in the art of security printing to mean any printable background which acts such as to secure against tampering of the document. Such security background can therefore comprise any marks or symbols. The background may be visible to the human eye or may be a latent background which is, for example, readable only by use of some special detector means, or which becomes readable after some development process.

In a simple case, the security background may simply be a collection of dots, so that the background appears shaded to the human eye. The shapes or arrangement marks or symbols may, however, in another aspect, have specific meaning, as with, for example, digital 'glyph' patterns, which are machine readable. 'Glyphs' are described, for example, in U.S. Pat. Nos. 5,091,966, 5,128,525 and 5,168,147.

In a preferred aspect, the character or character stream and security background are printed with the same ink or toner, for example, using a monochrome printer. This provides the advantage that because the ink or toner employed for both character(s) and background is the same, its adhesion characteristic to the printable substrate will also be the same. Selective removal of character(s) or background is thus made more difficult than would be so were different inks/toners of different adhesion characteristics employed for each of the character and background portions.

The electronic printer is in communication with a character or character stream generation system which includes a database. The term database herein is used to mean any accessible storage site or memory where data is kept.

The database comprises individual characters in electronic form, that is electronic descriptions of the characters. Preferably, the characters are in bit-map form. In a more preferred aspect these bit-map form characters have the same pitch, that is to say they have a bit-map cell of common pixel width.

In an essential aspect, the electronic form descriptions in the database are of individual characters with a defined security background. Thus, for example, when the descriptions are in bit-map form, the bit-map will contain elements relating to both the character and to its security background. The security background may be the same for each character or may vary with character type.

In a preferred embodiment, the database is a 'security font' library comprising descriptions of individual characters of the same font, each with a common security background.

The generation system also comprises a character or character stream manager capable, on instruction, of retrieving an electronic form character from the database. By 'on instruction' it is meant on receipt of some stimulus by the manager. Such stimulus will generally comprise an electronically conveyed signal generated, for example, in response input typed into a personal computer, or resulting from the running of a software package.

When a stream of characters is to be printed, the character stream manager retrieves a plurality of individual electronic form characters from the database and assembles the individual electronic form characters into an electronic form character stream.

The character or character stream manager then transmits the electronic form character or character stream to the electronic printer for single-pass printing on the document.

In preferred embodiments the system of the present invention is implemented via a suitably configured conventional workstation (personal computer) operating in communication with an electronic printer. An example of such a system is an IBM PC AT (trademark) operating with MS-Windows (trademark) and MS-Word (trademark) application software connected to an electronic printer such as the Xerox 4230/MRP MICR (trademark) printer which is responsive to Xerox 4230/MRP (trademark) driver software. A preference is given to Printer Control Language (PCL) type driver software as this allows fixed resolution bitmap fonts to be used. The Xerox 4230/MRP MICR (trademark) electronic printer has a PCL driver font database loaded with the security character font in bitmap form.

With the Xerox 4230/MRP MICR (trademark) electronic printer PCL driver selected in the MS-Word (trademark) application software, the security font becomes available for selection for use within a printed document. Thus, when the document is selected for print, the MS-Word (trademark) application in conjunction with the Xerox 4230/MRP MICR (trademark) electronic printer PCL driver sends a PCL data stream (which contains the embedded secure and standard font information) to the Xerox 4230/MRP MICR (trademark) electronic printer. The Xerox 4230/MRP MICR electronic printer transposes the PCL data stream into a bitmapped page image which is then single printed onto a document.

FIG. 1 shows an example of a check prepared in accord with the printing system of the invention. In preparing the document, the (document specific) text (10) comprising alphanumeric characters with a shaded security background was printed on a check (20) having some preprinted text (22) and (pre-prepared) safety background shading (24).

Figure 2:
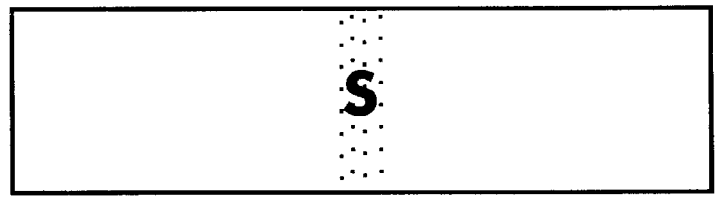
FIG. 2 is a schematic, elevational view of a first tamper-resistant, composite electronic form character residing in a database.

FIG. 2 shows an example of a single printed secure character comprising an alphanumeric and a background comprising an essentially regular arrangement of dots.

Figure 3:
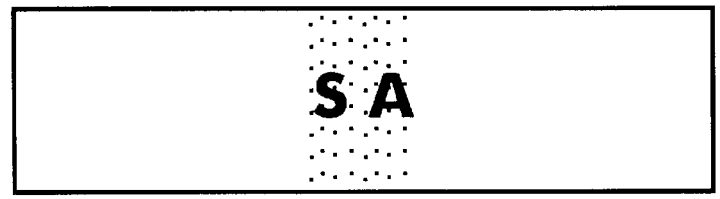
FIG. 3 is a schematic, elevational view of a second tamper-resistant, composite electronic form character operatively linked with the first tamper-resistance composite electronic form character in the database.

FIG. 3 shows an example of a printed secure character stream comprising two alphanumerics also having a background comprising an essentially regular arrangement of dots.

Figure 4:
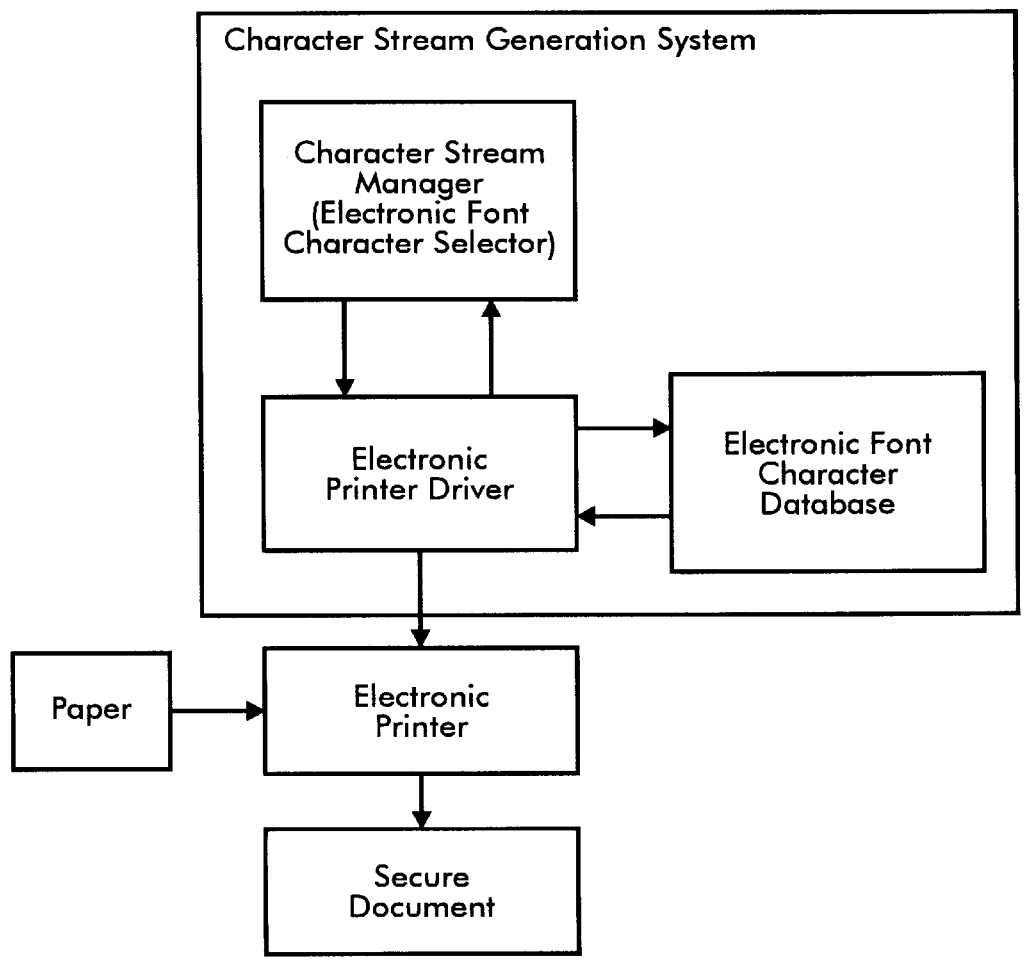
FIG. 4 is a block diagram of a document printing system having a character stream generation system in communication with an electronic printer.

FIG. 4 shows, in schematic representation, a document printing system having a character stream generation system in communication with an electronic printer which is supplied with paper. In operation, the character stream manager communicates with the electronic printer driver to trigger retrieval of the (document specific) character information from the electronic font character database. The electronic print driver instructs the electronic printer to print the (document specific) character on the paper.

Methods of printing

According to another aspect of the present invention there are provided methods of printing employing the printing systems described hereinbefore. These systems include a database comprising electronic form characters having a security background.

Accordingly, in one method aspect there is provided a method of printing a character with a security background on a document comprising the steps of (a) retrieving an electronic form character from a database (b) transmitting the retrieved electronic form character to an electronic printer; and (c) single-pass printing of the character on said document.

In another method aspect there is provided a method of printing a character stream with a security background on a document comprising the steps of: (a) retrieving a plurality of individual electronic form characters from said database; b) assembling said individual electronic form characters into an electronic form character stream; (c) transmitting of the electronic form character stream to said electronic printer; and (d) single-pass printing of the character stream on said document.

Character and character stream generation systems

According to another aspect of the present invention there are provided character and character stream generation systems suitable for use in the printing systems described hereinbefore.

The character and character stream generation systems employ a database comprising electronic form characters having a security background.

Accordingly, in one aspect there is provided a character generation system comprising: (i) a database of individual electronic form characters; (ii) a character manager capable, on instruction, of retrieving an electronic form character from said database and transmitting the electronic form character to said electronic printer for single-pass printing on a document.

In another aspect there is provided a character stream generation system comprising (i) a database of individual electronic form characters; (ii) a character stream manager capable on instruction of retrieving a plurality of individual electronic from characters into an electronic form character stream; and transmitting said electronic form character stream to said electronic printer for single-pass printing on a document.

What is claimed is:

1. A system for single-pass printing of a tamper-resistant, electronic form character on a print media sheet, comprising:
    (a) a printing subsystem; and
    (b) a character generation subsystem communicating with said printing subsystem, said character generation subsystem including,
        (i) a database for storing a plurality of tamper-resistant, composite electronic form characters, each of the plurality of tamper-resistant, composite electronic form characters including an electronic form character overlaying a security background, and
        (ii) a character manager for retrieving a selected one of the plurality of tamper-resistant, composite electronic form characters from said database in response to an instruction provided by said printing subsystem to said character manager, the selected one of the plurality of tamper-resistant, composite electronic form characters being transmitted to said printing subsystem for single-pass printing thereof on said print media sheet.

2. The system of claim 1, wherein the selected one of the plurality of tamper-resistant, composite electronic form characters is operatively linked with a second one of the plurality of tamper-resistant, composite electronic form characters so that said character manager retrieves the second one of the plurality of tamper-resistant composite electronic form characters in response to retrieving the selected one of the plurality of tamper-resistant composite electronic form characters.

3. The system of claim 1, wherein said printing subsystem comprises a monochrome printer.

4. The system of claim 1, wherein said printing subsystem comprises a color printer and a first color employed to print the security background is different than a second color employed for printing the selected one of the plurality of tamper-resistant, composite electronic form characters.

5. The system of claim 1, wherein the selected one of the plurality of tamper-resistant, composite electronic form characters is stored in said database as a bit-map.

6. The system of claim 1, wherein multiple ones of the plurality of tamper-resistant, composite electronic form characters are stored in said database as bit-maps and each of the multiple ones of the plurality of tamper-resistant, composite electronic form characters has the same pitch.

7. A character generation subsystem for use with a printing subsystem where tamper-resistant, electronic form characters are stored in anticipation of printing multiple ones of the tamper-resistant, electronic form characters on print media with the printing subsystem, comprising:
    a) a database for storing a plurality of tamper-resistant, composite electronic form characters, each of the plurality of tamper-resistant, composite electronic form characters including an electronic form character overlaying a security background; and
    b) a character manager for retrieving a selected one of the plurality of tamper-resistant, composite electronic form characters from said database in response to an instruction provided by said printing subsystem to said character manager, the selected one of the plurality of tamper-resistant, composite electronic form characters being transmitted to said printing subsystem for single-pass printing thereof on said print media sheet.

8. The character generation subsystem of claim 7, wherein the selected one of the plurality of tamper-resistant, composite electronic form characters is operatively linked with a second one of the plurality of tamper-resistant, composite electronic form characters so that said character manager retrieves the second one of the plurality of tamper-resistant composite electronic form characters in response to retrieving the selected one of the plurality of tamper-resistant composite electronic form characters.

9. The character generation subsystem of claim 7, wherein the selected one of the plurality of tamper-resistant, composite electronic form characters is stored in said database as a bit-map.

10. The character generation subsystem of claim 7, wherein multiple ones of the plurality of tamper-resistant, composite electronic form characters are stored in said database as bit-maps and each of the multiple ones of the plurality of tamper-resistant, composite electronic form characters has the same pitch.

11. A method of printing a tamper-resistant, electronic form character on a print media sheet in a single pass with a printing subsystem, comprising:

a) storing a plurality of tamper-resistant, composite electronic form characters in a database, each of the one or more tamper-resistant, composite electronic form characters including an electronic form character overlaying a security background;

b) retrieving a selected one of the plurality of tamper-resistant, composite electronic form characters from the database in response to an instruction provided by the printing subsystem to a character manager; and c) transmitting the select composite plurality of tamper-resistant, composite electronic form characters to the printing subsystem for single-pass printing thereof on the print media sheet.

12. The method of claim 11, further comprising operatively linking the selected one of the plurality of tamper-resistant, composite electronic form characters with a second one of the plurality of tamper-resistant, composite electronic form characters so that the character manager retrieves the second one of the plurality of tamper-resistant composite electronic form characters in response to retrieving the selected one of the plurality of tamper-resistant composite electronic form characters.

* * * * *